US012661813B2

(12) United States Patent
Cheng

(10) Patent No.: US 12,661,813 B2
(45) Date of Patent: Jun. 23, 2026

(54) FOLDING KNIFE WITH ELASTIC BAR AND DOUBLE SAFETY MECHANISM

(71) Applicant: Kantas Products Co., Ltd., Taipei City (TW)

(72) Inventor: Yang-Fu Cheng, Taipei City (TW)

(73) Assignee: Kantas Products Co., Ltd., Taipei City (TW)

( * ) Notice: Subject to any disclaimer, the term of this patent is extended or adjusted under 35 U.S.C. 154(b) by 91 days.

(21) Appl. No.: 18/801,829

(22) Filed: Aug. 13, 2024

(65) Prior Publication Data

US 2025/0249609 A1 Aug. 7, 2025

(30) Foreign Application Priority Data

Feb. 5, 2024 (TW) ................................ 113201406

(51) Int. Cl.
*B26B 1/04* (2006.01)

(52) U.S. Cl.
CPC ...................................... *B26B 1/04* (2013.01)

(58) Field of Classification Search
CPC .......... B26B 1/044; B26B 1/046; B26B 1/048
USPC .................................................. 30/161–162
See application file for complete search history.

(56) References Cited

U.S. PATENT DOCUMENTS 6,834,432 B1 * 12/2004 Taylor, Jr. ............... B26B 1/044 30/160
7,086,157 B2 * 8/2006 Vallotton ............... B26B 1/046 30/159
7,278,213 B2 * 10/2007 Pardue ..................... B26B 1/04 30/159
8,893,389 B2 * 11/2014 Freeman ................ B26B 1/046 30/155
2009/0193664 A1 * 8/2009 Galyean ................. B26B 1/046 30/161
2016/0121493 A1 * 5/2016 Ikoma ..................... B26B 1/042 30/161

FOREIGN PATENT DOCUMENTS

CN 102806567 A * 12/2012 ............. B26B 1/046

OTHER PUBLICATIONS

Translation CN102806567 (Year: 2026).*

* cited by examiner

*Primary Examiner* — Nhat Chieu Q Do

(57) ABSTRACT

A folding knife includes an elastic bar, a first safety mechanism, a second safety mechanism, a handle, and a blade that has a rear end pivotally connected to a front end of the handle and can be rotated out of or into the handle. When the blade is stored in the handle, the elastic bar presses against the blade and apply a force to the blade that pushes the blade along a direction out of the handle. When the first safety mechanism is not pressed, it can press the blade and the blade is kept at its current position and cannot be rotated. When the second safety mechanism is at a locking position, the second safety mechanism prevents the first safety mechanism from being pressed.

18 Claims, 16 Drawing Sheets

FOLDING KNIFE WITH ELASTIC BAR AND DOUBLE SAFETY MECHANISM

CROSS-REFERENCE TO RELATED PATENT APPLICATION

This non-provisional application claims priority to and the benefit of, under 35 U.S.C. § 119 (a), Taiwan Patent Application No. 113201406, filed Feb. 5, 2024 in Taiwan. The entire content of the above identified application is incorporated herein by reference.

FIELD

The present disclosure is related to a folding knife, and more particularly to a folding knife that uses an elastic bar as the source of force for pushing a blade, and has a first safety mechanism that prevents the blade from being rotated and a second safety mechanism that prevents the operation of the first safety mechanism.

BACKGROUND

All the commercially available folding knives are composed of a handle and a blade, wherein the blade and the handle are pivotally connected so that the blade can be rotated around the pivotal connection point either out of the handle or back into the handle for storage. A folding knife in a folded state has a relatively small volume and therefore can be easily carried around, with the blade stored in the handle to provide a higher level of carrying safety. This explains why for users such as divers, outdoor activity enthusiasts, soldiers, and the police, folding knives are more convenient than knives whose blade cannot be folded away.

Nowadays, a folding knife typically uses a volute spring as the source of force for pushing the blade. The volute spring is mounted where the blade and the handle are pivotally connected, and each of the two ends of the volute spring presses against one or the other of the blade and the handle in order to generate a force that always tends to push the blade outward. A user only has to unlock the blade locking mechanism, and the blade will spin out automatically due to the force of the volute spring. Accordingly, such a spring-loaded knife can be used promptly and single-handedly to deal with an emergency in a special or urgent situation. For example, a fisherman who is in a diving operation and has one hand caught in a fishing net may use such a spring-loaded knife to cut off the fishing net immediately so as to escape from danger and protect his or her life from a deadly threat.

A conventional volute spring-loaded folding knife nevertheless has the following problems:

(1) To make it easier for a user to carry such a folding knife around or put it away, it is common practice for such a folding knife to have a relatively small-volume design, and because of that, the volume of the volute spring has to be reduced as well. As the volute spring is formed by winding a linear wire or planar material into a spiral shape, the relatively small volume adds to the difficulty of production.

(2) During assembly, it is difficult to fix a relatively small volute spring precisely at the position where the blade is pivotally connected to the handle. The difficulty not only prolongs the production time, but also increases the defective rate of the product.

(3) In order to be able to mount the volute spring in the handle, the thickness of the handle must be increased so that the volute spring can be put into the handle. The increased thickness, however, works against the design principle of folding knife volume reduction, and the dilemma undoubtedly increases the difficulty of design. Moreover, a relatively thick handle is disadvantageous to gripping, which is especially true for users with relatively small palms.

(4) Each of the two ends of the volute spring must press against one or the other of the blade and the handle in order to generate a force for pushing the blade outward, and to this end, one current approach is to form a groove in the pivot shaft of the handle so that one end of the volute spring can be held in the groove of the pivot shaft in a hooked manner while the other end of the volute spring is hooked to the blade. The required assembly process, however, is not only complicated but also difficult to perform. The hooking operations, in particular, can be strenuous when the volume of the folding knife is relatively small.

According to the above, it can be known that the use of volute springs has indeed caused production troubles to folding knife manufacturers, and incurred extra labor and cost. How to effectively solve the above-referenced inadequacies is therefore one of the issues addressed in the present disclosure.

SUMMARY

As there is still room for improvement for the structure of a conventional spring knife with a volute spring, as a result of longtime research and experiment, a folding knife with an elastic bar and a double safety mechanism is provided in the present disclosure, so as to provide better use experience to users. In the folding knife, the elastic bar replaces a volute spring, is located in the same space with the blade, thereby lowering the overall thickness of the folding knife, and can push the blade outward, thereby increasing the safety of the folding knife.

Certain aspects of the present disclosure are directed to a folding knife with a double safety mechanism. The folding knife includes a handle, a blade, an elastic bar, a first safety mechanism and a second safety mechanism. The handle includes a first handle portion formed with a receiving groove, and a second handle portion formed with a slide groove and a through hole corresponding in position to the receiving groove. The handle has a receiving space between the first handle portion and the second handle portion. At least a portion of the groove bottom of the slide groove is in communication with the receiving space. The blade has a rear end pivotally connected to a front end of the handle, and can be rotated out of the handle and rotated into the receiving space of the handle around a position of the blade that is pivotally connected to the handle. The elastic bar is located in the receiving space of the handle, has a rear end that can be extended into an assembly groove of the first handle portion and a front end located adjacent to the position of the blade that is pivotally connected to the handle, and can press against the blade and apply a rotating force to the blade that pushes the blade along a direction out of the handle when the blade is stored in the handle. The first safety mechanism includes an engaging post and an elastic element. The engaging post includes, sequentially from one end of the engaging post to the other end of the engaging post, a pressing unit, a position-limiting unit, a passage-allowing unit and an engaging unit. The pressing unit can be extended into the through hole from an inner side of the second handle portion and be exposed from an outer side of the second handle portion. The greatest length of the position-limiting unit in the transverse direction is greater than the hole diameter of the through hole, so as to prevent the engaging post from separating from the through hole. The engaging unit can, when the pressing unit is pressed, be disengaged from the blade and prevented from being pressed against the outer edge of the blade, so that the blade is pushed by the elastic bar and rotated out of the handle and a portion of the outer edge of the blade passes through an area corresponding to the receiving groove while the blade is being rotated outward. The greatest length of the passage-allowing unit in the transverse direction is less than the greatest length of the engaging unit in the transverse direction. The elastic element is located in the receiving groove and can: push the engaging unit in a direction away from the receiving groove; and when the blade is stored in the handle and the pressing unit is not pressed, push the engaging unit and press the engaging unit against the outer edge of the blade, so that the blade is blocked by the engaging unit and prevented from being rotated outward. The second safety mechanism includes a locking plate and a driving portion. The locking plate is located in the receiving space and formed at a side thereof with a moving groove for the engaging post to be extended therein. The driving portion is located in the slide groove, and fixed to the locking plate. The driving portion be displaced forward and rearward; drive the locking plate to move; move the locking plate from an unlocking position to a locking position when the pressing unit is not pressed, such that a portion of the locking plate is moved to a position corresponding to a portion of the position-limiting unit and the engaging post is prevented from being pressed to move; and move the locking plate from the locking position to the unlocking position such that no other portion of the locking plate than the moving groove corresponds to the position-limiting unit and the engaging post is allowed to be pressed to move. In this way, when a user presses the engaging post, the blade can be released, so that the blade can be pushed by the elastic bar and swiftly rotated out of the handle. Or, the user can rotate the blade by himself or herself, so that the blade is stored in the handle. Further, when the user no longer presses the engaging post, the engaging post can be automatically engaged with the blade, and then the user can push the driving portion so that the engaging post is in a state in which it cannot be pressed to move, so that the blade can stably stay at its current position.

In certain embodiments, one side of the blade is concavely formed with a passage-allowing groove, the passage-allowing groove corresponds in position to the receiving groove when the blade is stored in the receiving space of the handle, the engaging unit is extended into the passage-allowing groove and pressed against the groove wall of the passage-allowing groove when the pressing unit is not pressed, the engaging unit is disengaged from the passage-allowing groove and leaves the passage-allowing unit in the passage-allowing groove when the pressing unit is pressed, and the passage-allowing unit allows passage of the blade without being touched by the blade when the blade is rotated out of the handle around the position of the blade that is pivotally connected to the handle.

In certain embodiments, the width of a first end of the engaging unit that is closer to the passage-allowing unit than a second end of the engaging unit increases along a direction toward the second end of the engaging unit, and the greatest width of the engaging unit is greater than a distance between any two opposite sidewall portions of the passage-allowing groove.

In certain embodiments, a positioning groove is concavely formed at a peripheral portion of the rear end of the blade, and the elastic element can, when the blade is rotated fully out of the handle and the pressing unit is not pressed, push the engaging unit and press the engaging unit against the groove wall of the positioning groove, so that the blade is blocked by the engaging unit from inward rotation.

In certain embodiments, the inner side of the first handle portion is protrudingly provided with a stop post, the blade is concavely formed with a stop groove at a position adjacent to the positioning groove, and the stop post is in the stop groove and abuts the groove wall of the stop groove when the blade is rotated fully out of the handle.

In certain embodiments, the folding knife further includes a locking member that can be extended into the assembly groove and press against the elastic bar from a lateral side of the elastic bar.

In certain embodiments, the locking member is a screw.

In certain embodiments, the groove bottom of the slide groove is formed with a recess, the inner side of the driving portion has a protruding block, when the driving portion is at the locking position, the protruding block is in the recess, and when the driving portion is moved toward the unlocking position, the protruding block is moved away from the recess.

In certain embodiments, the locking plate is formed with two coupling recesses, the second handle portion is provided with a coupling portion, and the coupling portion is located in one of the coupling recesses when the driving portion and the locking plate are at the locking position, and located in the other one of the coupling recesses when the driving portion and the locking plate are at the unlocking position.

In certain embodiments, the inner side of the second handle portion is formed with a hole, and the coupling portion includes a ball and a spring. At least a portion of the ball can be exposed from the hole and be pushed in one of the coupling recesses. The spring is located in the hole and has a first end pressed against the hole bottom of the hole and a second end that can push the ball.

Certain aspects of the present disclosure are directed to a folding knife with a double safety mechanism. The folding knife includes a handle, a blade, an elastic bar, a first safety mechanism and a second safety mechanism. The handle includes a first handle portion formed with a receiving groove at an inner side thereof, and a second handle portion formed with a through hole corresponding in position to the receiving groove. The handle has a receiving space between the first handle portion and the second handle portion. The blade has a rear end pivotally connected to a front end of the handle, and can be rotated out of the handle and rotated into the receiving space of the handle around a position of the blade that is pivotally connected to the handle. The elastic bar is located in the receiving space of the handle, has a rear end that can be extended into an assembly groove of the handle and a front end located adjacent to the position of the blade that is pivotally connected to the handle, and can press against the blade and apply a rotating force to the blade that pushes the blade along a direction out of the handle when the blade is stored in the handle. The first safety mechanism includes an engaging post and an elastic element. The engaging post includes, sequentially from one end of the engaging post to the other end of the engaging post, a pressing unit, a position-limiting unit, a passage-allowing unit, and an engaging unit. The pressing unit can be extended into the through hole from the inner side of the second handle portion and be exposed from the outer side of the second handle portion. The greatest length of the position-limiting unit in the transverse direction is greater than the hole diameter of the through hole, so as to prevent the engaging post from separating from the through hole. The engaging unit can be extended in the receiving groove and, when the pressing unit is pressed, be disengaged from the blade and prevented from being pressed against the outer edge of the blade, so that the blade is pushed by the elastic bar and rotated out of the handle and a portion of the outer edge of the blade passes through an area corresponding to the receiving groove while the blade is being rotated outward. The greatest length of the passage-allowing unit in the transverse direction is less than the greatest length of the engaging unit in the transverse direction. The elastic element is located in the receiving groove and can push the engaging unit in a direction away from the receiving groove, and when the blade is stored in the handle and the pressing unit is not pressed, push the engaging unit and press the engaging unit against the outer edge of the blade, so that the blade is blocked by the engaging unit and prevented from being rotated outward. The second safety mechanism includes a locking plate and a driving portion. The locking plate is located in the receiving space and formed at a side thereof with a moving groove for the engaging post to be extended therein. The driving portion is located in the receiving space, is fixed to the locking plate, and can: be displaced forward and rearward; drive the locking plate to move; move the locking plate from an unlocking position to a locking position when the pressing unit is not pressed, such that a portion of the locking plate is moved to a position corresponding to a portion of the position-limiting unit and the engaging post is prevented from being pressed to move; and move the locking plate from the locking position to the unlocking position such that no other portion of the locking plate than the moving groove corresponds to the position-limiting unit and the engaging post is allowed to be pressed to move.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION

Figure 1:
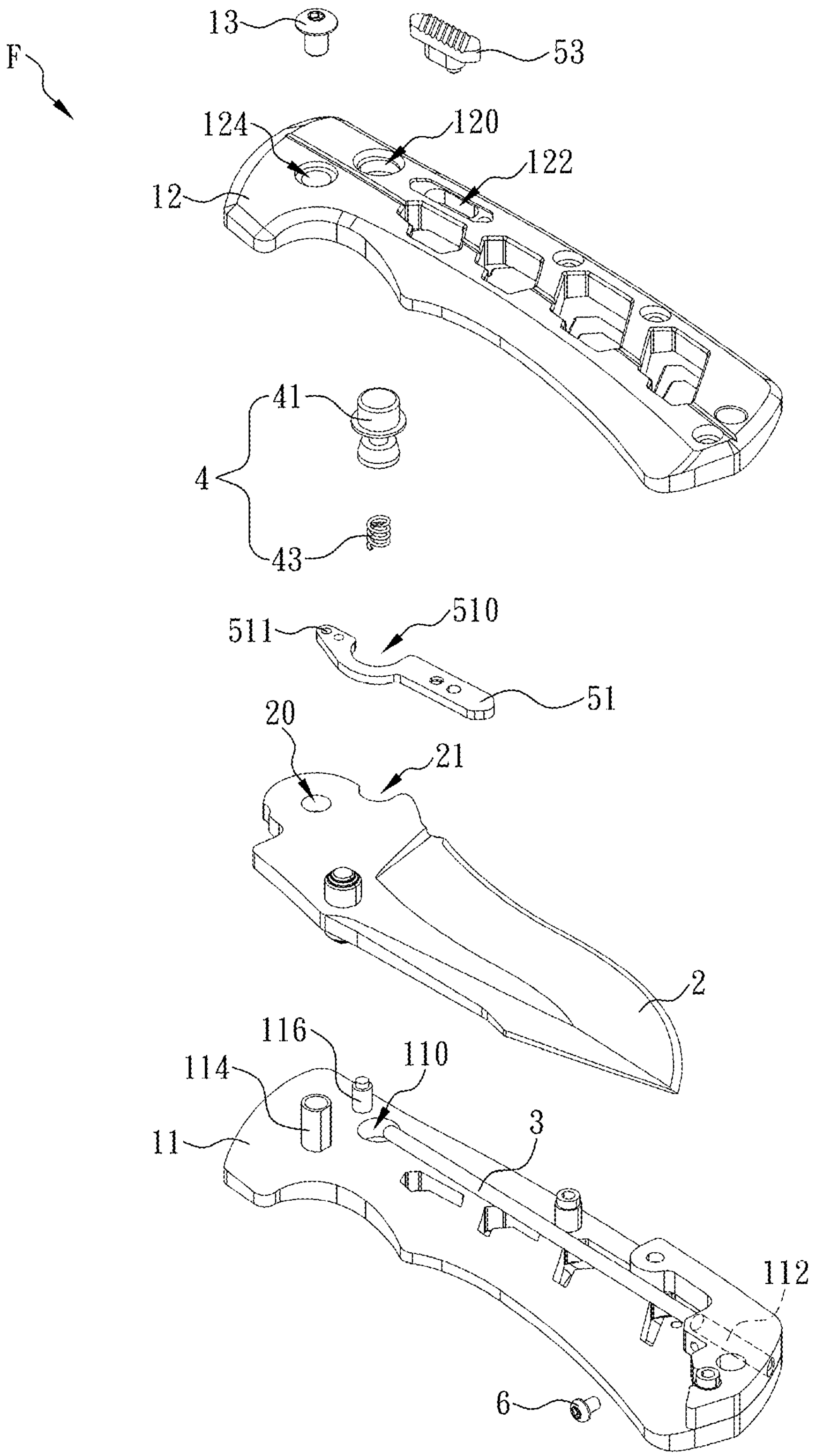
FIG. 1 is an exploded view of a folding knife according to certain embodiments of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of “a”, “an”, and “the” includes plural reference, and the meaning of “in” includes “in” and “on”. Titles or subtitles can be used herein for the convenience of a reader, which shall have no influence on the scope of the present disclosure.

The accompanying drawings are schematic and may not have been drawn to scale. The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, materials, objects, or the like, which are for distinguishing one component/material/object from another one only, and are not intended to, nor should be construed to impose any substantive limitations on the components, materials, objects, or the like. Directional terms (e.g., "front", "rear", "left", "right", "upper/top" and/or "lower/bottom") are explanatory only and are not intended to be restrictive of the scope of the present disclosure.

Figure 2:
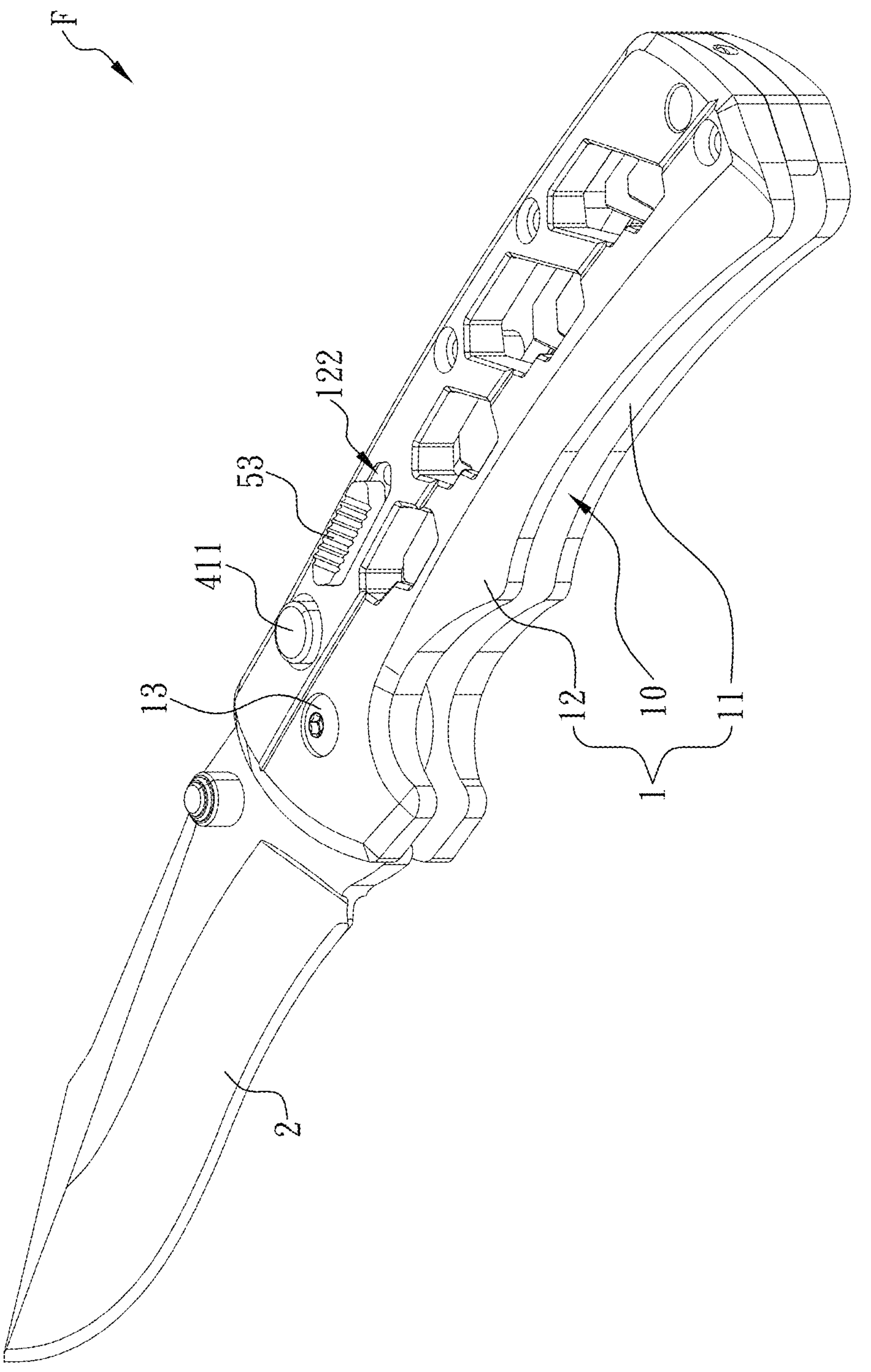
FIG. 2 is a schematic diagram of the folding knife being unfolded according to certain embodiments of the present disclosure, in which its blade has been rotated fully out of its handle.
Figure 3:
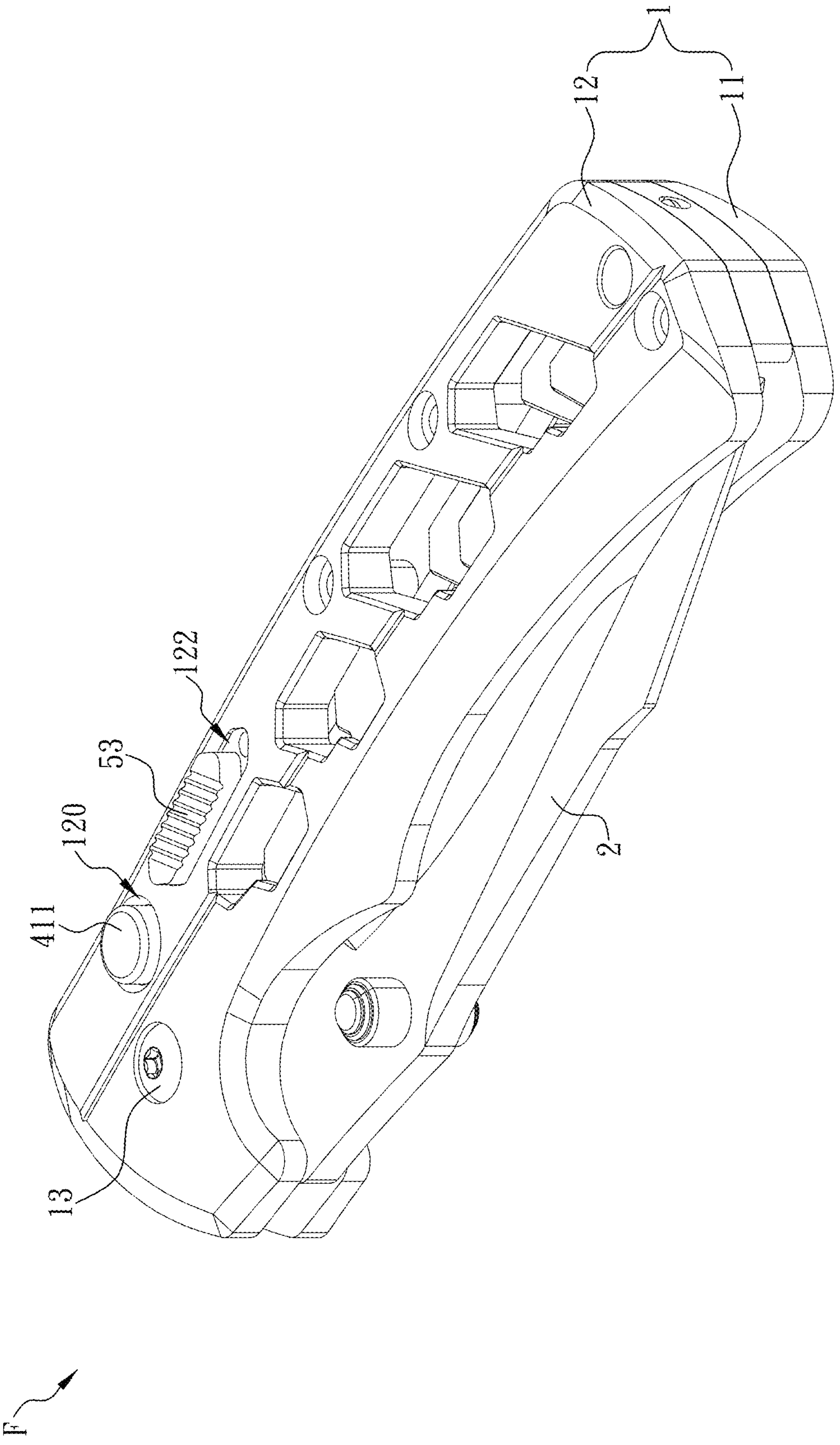
FIG. 3 is a schematic diagram of the folding knife been folded according to certain embodiments of the present disclosure, in which its blade has been stored fully in its handle.

Certain aspects of the present disclosure are directed to a folding knife that has an elastic bar and a double safety mechanism. Referring to FIG. 1 to FIG. 3, the folding knife F in certain embodiments includes a handle 1, a blade 2, an elastic bar 3, a first safety mechanism 4, and a second safety mechanism 5. The blade 2 is configured to be pivotally connected to the handle 1 and be rotated into the handle 1 for storage and out of the handle 1 for full exposure. To facilitate description of the relative positions of the various elements, the front side of each element is defined as facing the upper left corner of FIG. 2, the rear side as facing the lower right corner of FIG. 2. The handle 1 includes a first handle portion 11 and a second handle portion 12, and has a receiving space 10 between the first handle portion 11 and the second handle portion 12 for receiving the blade 2.

With continued reference to FIG. 1 to FIG. 3, the inner side of the first handle portion 11 is formed with a receiving groove 110 and an assembly groove 112. The receiving groove 110 is adjacent to the front end of the first handle portion 11 and the assembly groove 112 is adjacent to the rear end of the first handle portion 11. The second handle portion 12 is formed with a through hole 120 and a slide groove 122. The through hole 120 penetrates through the second handle portion 12, is open on both the inner side and the outer side of the second handle portion 12, and corresponds in position to the receiving groove 110. The slide groove 122 is located at the outer side of the second handle portion 12, and at least a portion of the groove bottom of the slide groove 122 is in communication with the receiving space 10. In other words, when viewed from above the slide groove 122, the contents of the receiving space 10 are exposed directly through the entire groove bottom, or a portion of the groove bottom, of the slide groove 122. The term "inner side" of a handle portion refers to the side that corresponds to and faces the receiving space 10, and term "outer side" of a handle portion refers to the side that faces away from the receiving space 10.

With continued reference to FIG. 1 to FIG. 3, the rear end of the blade 2 can be pivotally connected to the front end of the handle 1, and the blade 2 can be rotated out of the handle 1 around a position of the blade 2 that is pivotally connected to the handle 1 (as shown in FIG. 2), and rotated back into the handle 1 for storage around the position of the blade 2 that is pivotally connected to the handle 1 (as shown in FIG. 3). In certain embodiments, the inner side of the first handle portion 11 has a pivot shaft 114 at a position adjacent to the front end of the first handle portion 11, the second handle portion 12 is formed with a pivot hole 124 at a position corresponding to the pivot shaft 114, and the blade 2 is formed with a through bore 20. The pivot shaft 114 is configured to pass sequentially through the through bore 20 and the pivot hole 124, and a screw 13 can be locked to the pivot shaft 114 to connect the blade 2 and the handle 1 together as a single unit. In certain embodiments, the blade 2 and the handle 1 can, depending on actual product requirements, use pivotal connection structures different from those described above, as long as the blade 2 can be rotated out of and into the handle 1 when subjected to a force intended to cause such a rotation. Moreover, one side of the blade 2 in certain embodiments can be concavely formed with a passage-allowing groove 21, and the passage-allowing groove 21 corresponds in position to the receiving groove 110 when the blade 2 is stored in the receiving space 10 of the handle 1. However, in certain embodiments, according to actual product requirements, the blade 2 can be without the passage-allowing groove 21 or an obvious configuration thereof while still be able to achieve the interaction with other components (especially the first safety mechanism 4) as described infra.

Figure 4:
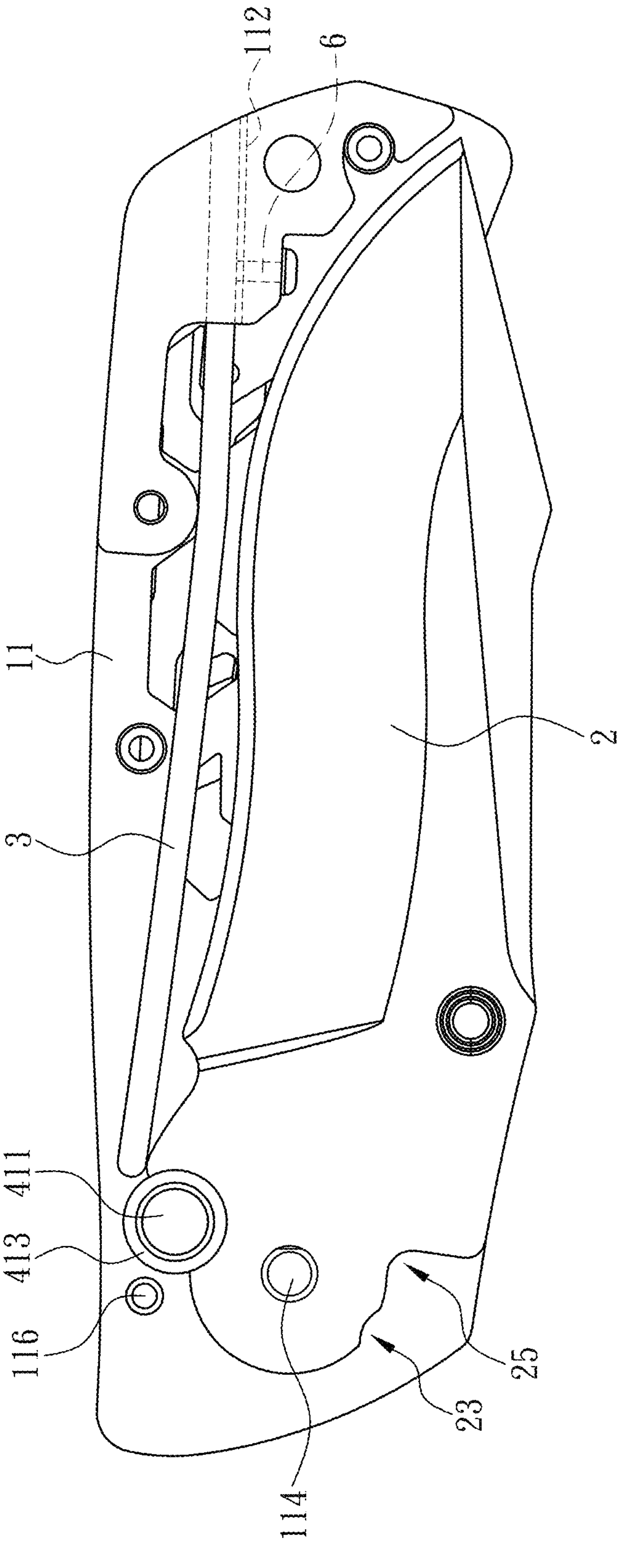
FIG. 4 is an assembled view of the folding knife in a folded configuration according to certain embodiments of the present disclosure, omitting a second handle portion thereof.

With continued reference to FIG. 1 to FIG. 3, the elastic bar 3 can be located in the receiving space 10 of the handle 1 and has a rear end that can be extended into the assembly groove 112 of the first handle portion 11. A locking member 6 (such as but not limited to a screw) can be extended into the assembly groove 112 and press against the elastic bar 3 from a lateral side thereof. Referring to FIG. 4 for example, the rear end of the elastic bar 3 can be extended into the assembly groove 112 along the left-to-right direction in FIG. 4, and the locking member 6 is extended into the assembly groove 112 along the bottom-to-top direction in FIG. 4 and presses against a lateral side of the elastic bar 3 to fix the elastic bar 3 securely to the handle 1 (for example, on the first handle portion 11). The locking member 6 is hidden in the receiving space 10 and hence is relatively unlikely to be affected by an external force, e.g., in cases where the first handle portion 11 and the second handle portion 12 are inadvertently pushed open from the inside or hit. The locking member 6, therefore, can ensure that the elastic bar 3 is securely fixed to the handle 1. In certain embodiments, the assembly groove 112 can be provided on the second handle portion 12. In certain embodiments, the assembly groove 112 can be formed jointly by the first handle portion 11 and the second handle portion 12. In certain embodiments, the elastic bar 3 can be fixed in the handle 1 by other methods. In certain embodiments, the elastic bar 3 extends towards its front end along a direction toward the front end of the handle 1 and extends to a position adjacent to the position where the blade 2 and the handle 1 are pivotally connected. When the blade 2 is stored in the handle 1, the elastic bar 3 presses against the blade 2 (as shown in FIG. 4) and applies a rotating force to the blade 2 that pushes the blade 2 along a direction out of the handle 1.

Referring to FIGS. 1-3 and 5, the first safety mechanism 4 includes an engaging post 41 and an elastic element 43. The engaging post 41 includes, sequentially from one end to the other end thereof, a pressing unit 411, a position-limiting unit 413, a passage-allowing unit 415, and an engaging unit 417. The pressing unit 411 is configured to be extended into the through hole 120 from the inner side of the second handle portion 12 and be exposed from the outer side of the second handle portion 12 so that a user can press the pressing unit 411 while holding the handle 1. The position-limiting unit 413, the passage-allowing unit 415, and the engaging unit 417 can be located in the receiving space 10, and the combined length of the position-limiting unit 413, the passage-allowing unit 415, and the engaging unit 417 is less than the distance from the inner side of the second handle portion 12 to the groove bottom of the receiving groove 110 (see FIG. 6). In addition, the greatest length of the engaging unit 417 in the transverse direction is less than the groove diameter of the receiving groove 110 so that the engaging unit 417 can be extended into the receiving groove 110 and move up and down in the receiving groove 110.

Figure 5:
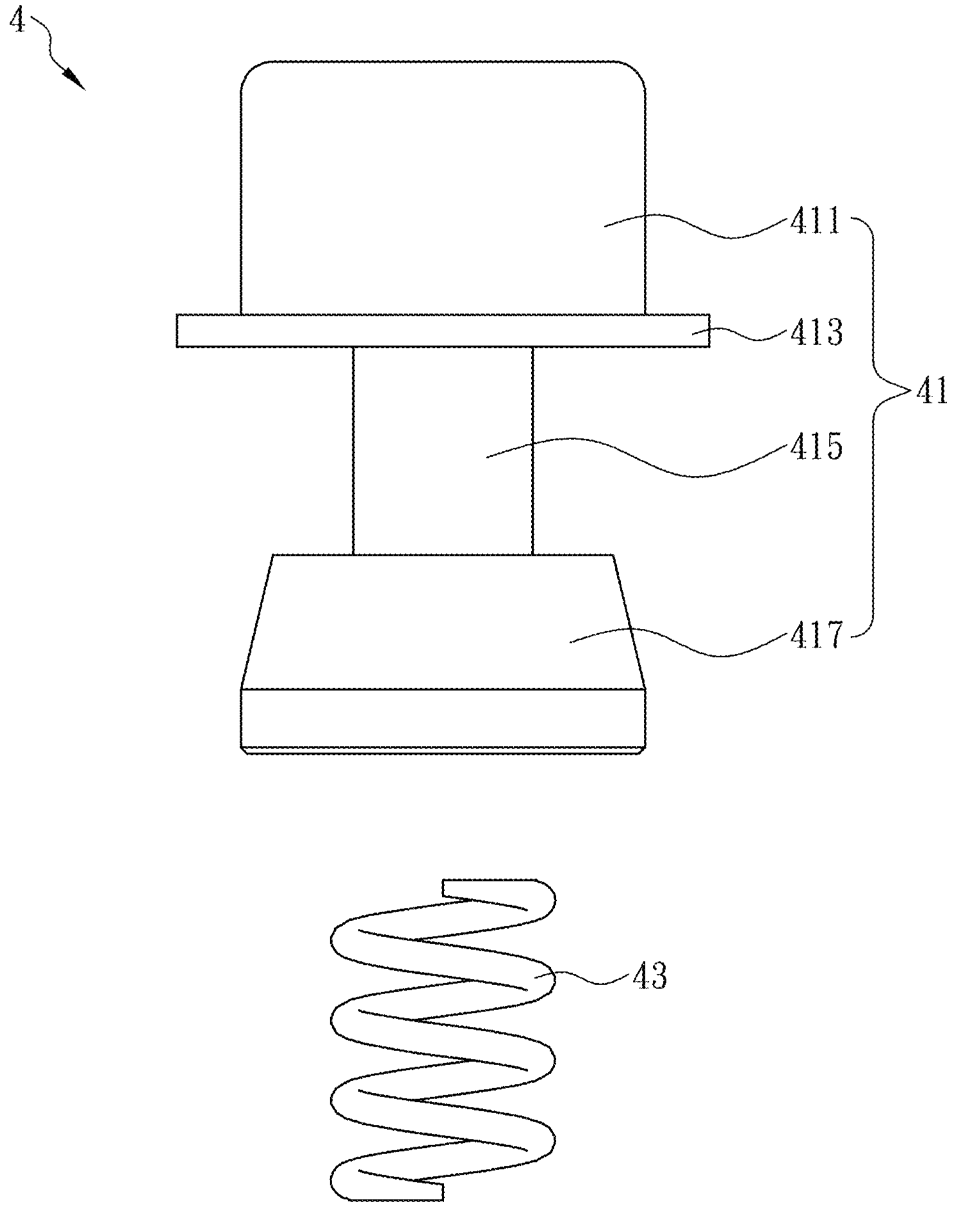
FIG. 5 is an exploded view of a first safety mechanism of the folding knife according to certain embodiments of the present disclosure.
Figure 6:
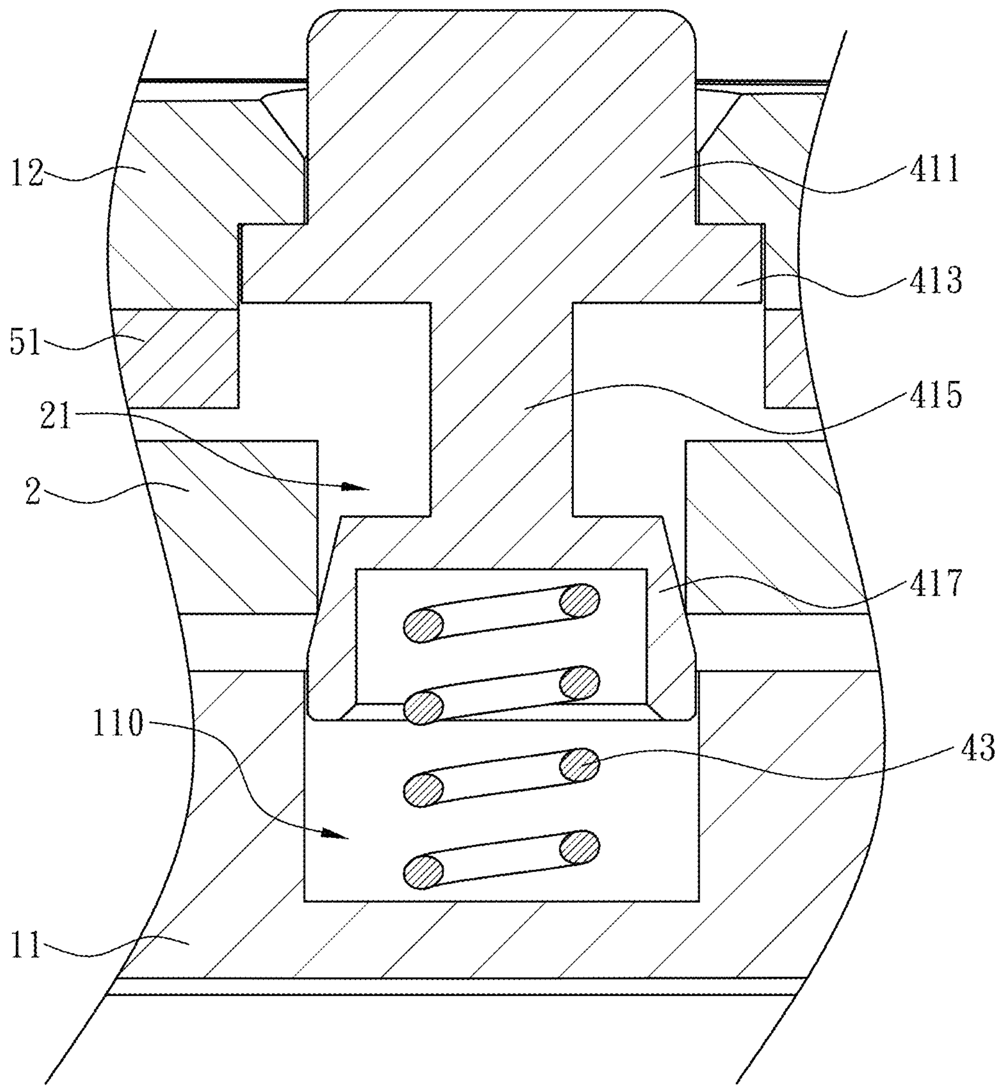
FIG. 6 is a cross-sectional view of a portion of the folding knife according to certain embodiments of the present disclosure.

As shown in FIGS. 1, 5 and 6, the position-limiting unit 413 can be shaped as a thin plate, with its greatest length in the transverse direction (for example, the leftward-rightward direction in FIG. 5) greater than the hole diameter of the through hole 120 so that once the pressing unit 411 is extended into the through hole 120, the position-limiting unit 413 can abut against the inner side of the second handle portion 12 and thus be kept from passing through the through hole 120, so as to prevent the engaging post 41 from separating from the through hole 120 and to help position the engaging post 41 in the handle 1. The passage-allowing unit 415 can be a thin cylinder, with its greatest length in the transverse direction (for example, the leftward-rightward direction in FIG. 5) less than the greatest length of the engaging unit 417 in the transverse direction and less than the distance between any two opposite sidewall portions of the passage-allowing groove 21. In other words, the passage-allowing unit 415 will not contact the blade 2 while in the passage-allowing groove 21. The width of the end of the engaging unit 417 that is closer to the passage-allowing unit 415 increases along a direction toward the opposite end of the engaging unit 417 such that the portion of the end that has the increased width can be in an approximately trapezoidal or conical shape. The greatest width of the engaging unit 417 is greater than the distance between any two opposite sidewall portions of the passage-allowing groove 21. The elastic element 43 can be located in the receiving groove 110, with its first end and second end pressing against the groove bottom of the receiving groove 110 and the other end of the engaging post 41, respectively, such that the elastic element 43 can apply a force to the engaging post 41 that pushes the engaging post 41, and hence the engaging unit 417, in a direction away from the receiving groove 110.

Figure 7:
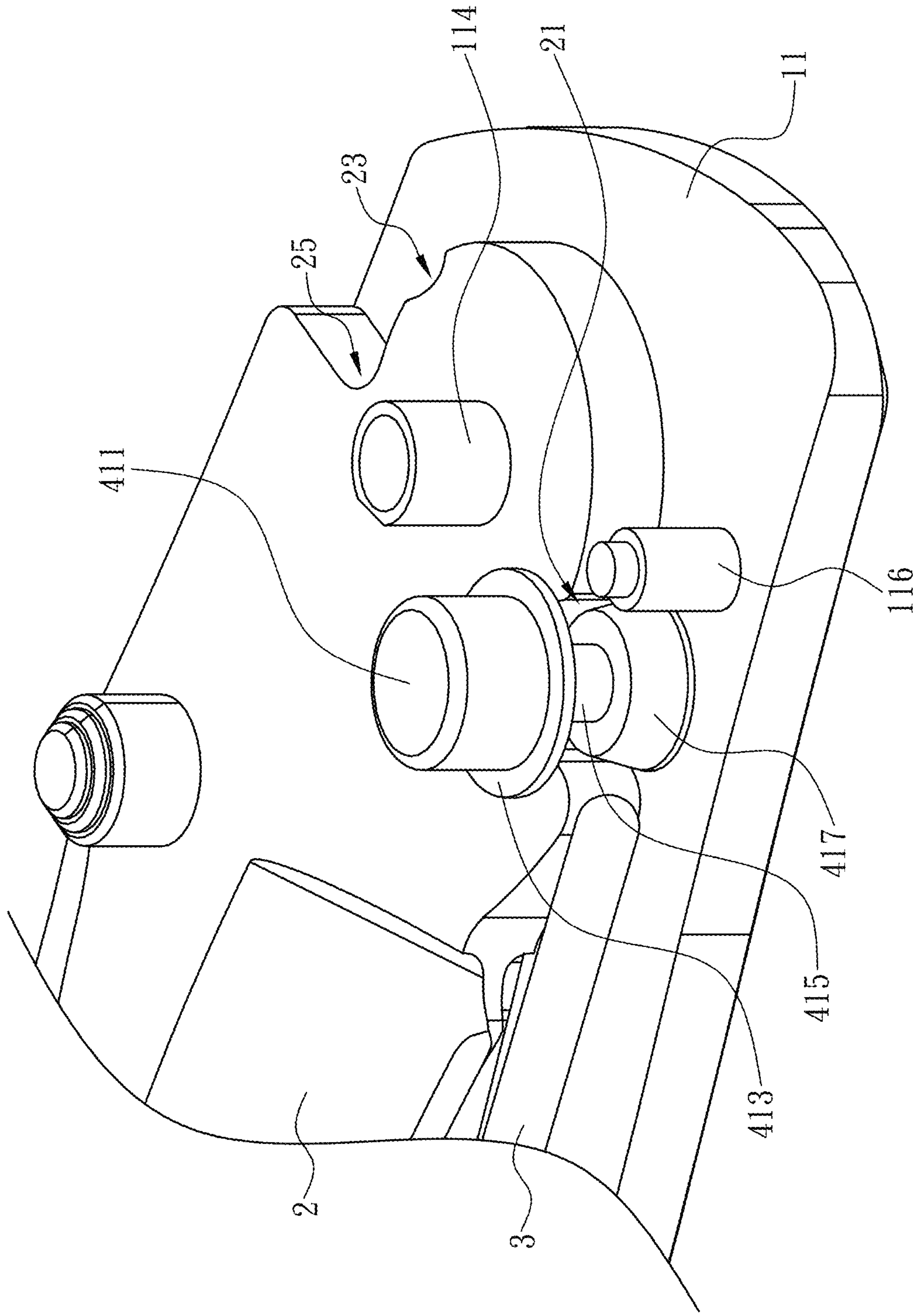
FIG. 7 is a perspective view of a portion of the folding knife in a folded configuration according to certain embodiments of the present disclosure, omitting the second handle portion thereof.
Figure 8:
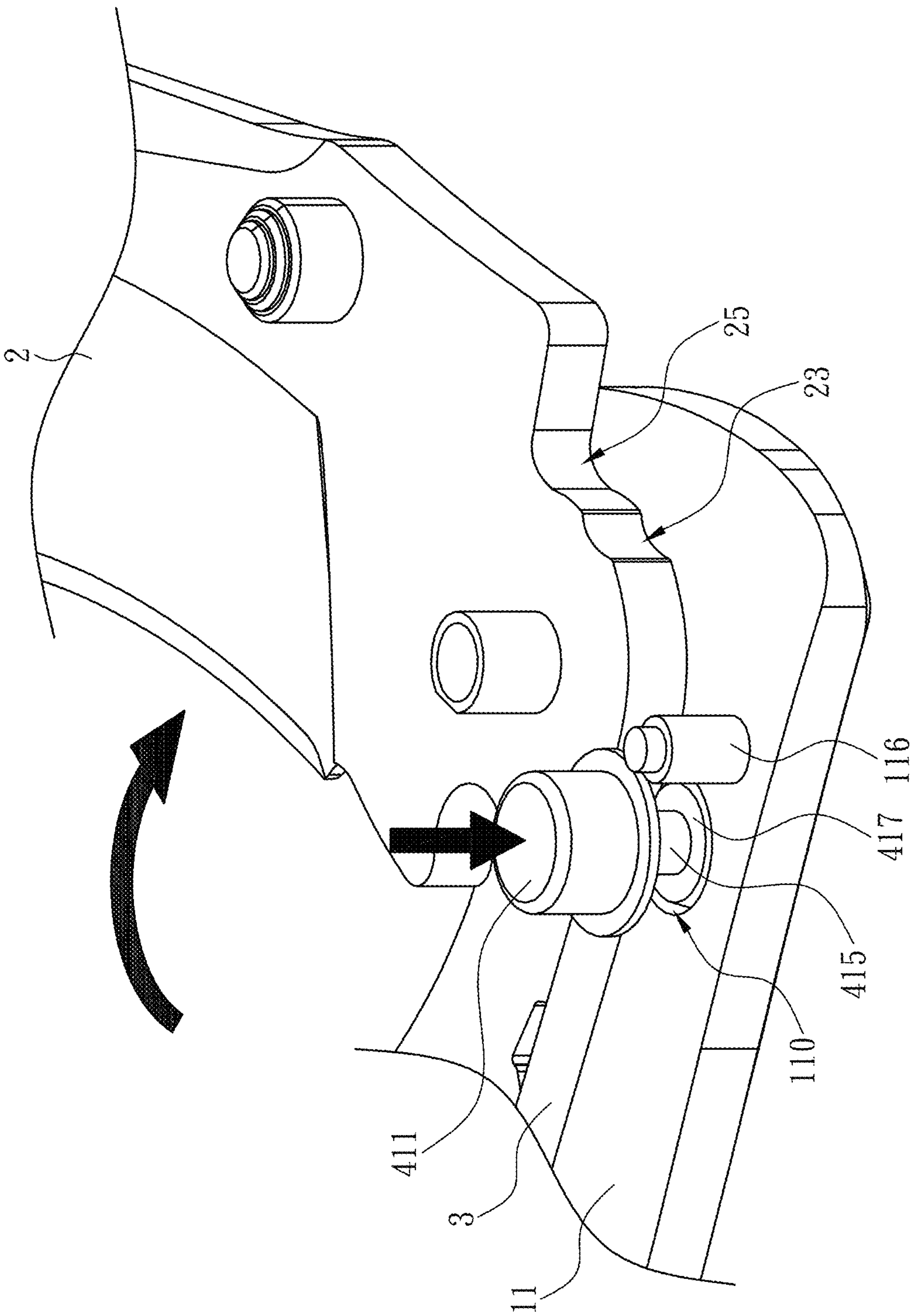
FIG. 8 is a perspective view of a portion of the folding knife when being unfolded according to certain embodiments of the present disclosure, omitting the second handle portion thereof.

Referring to FIG. 1 to FIG. 8, in which the second handle portion 12 is not shown in FIGS. 7 and 8 to facilitate description of the interaction between components, when the blade 2 is stored in the handle 1 and the pressing unit 411 is not pressed, the elastic element 43 pushes the engaging unit 417 in a direction away from the receiving groove 110 such that the engaging unit 417 is pressed against the outer edge of the blade 2. The engaging unit 417 is extended into the passage-allowing groove 21 and is pressed against the groove wall of the passage-allowing groove 21 such that the blade 2 is blocked by the engaging unit 417 and prevented from being rotated outward. When a user presses the pressing unit 411, the engaging unit 417 will be disengaged from the blade 2 and therefore prevented from being pressed against the outer edge of the blade 2. The engaging unit 417 will be disengaged from the passage-allowing groove 21, leaving only the passage-allowing unit 415 in the passage-allowing groove 21. At this time, the blade 2 can be pushed out of the handle 1 by the elastic bar 3. While the blade 2 is being rotated outward, a portion of its outer edge will pass through an area corresponding to the receiving groove 110 without touching the passage-allowing unit 415.

Figure 9:
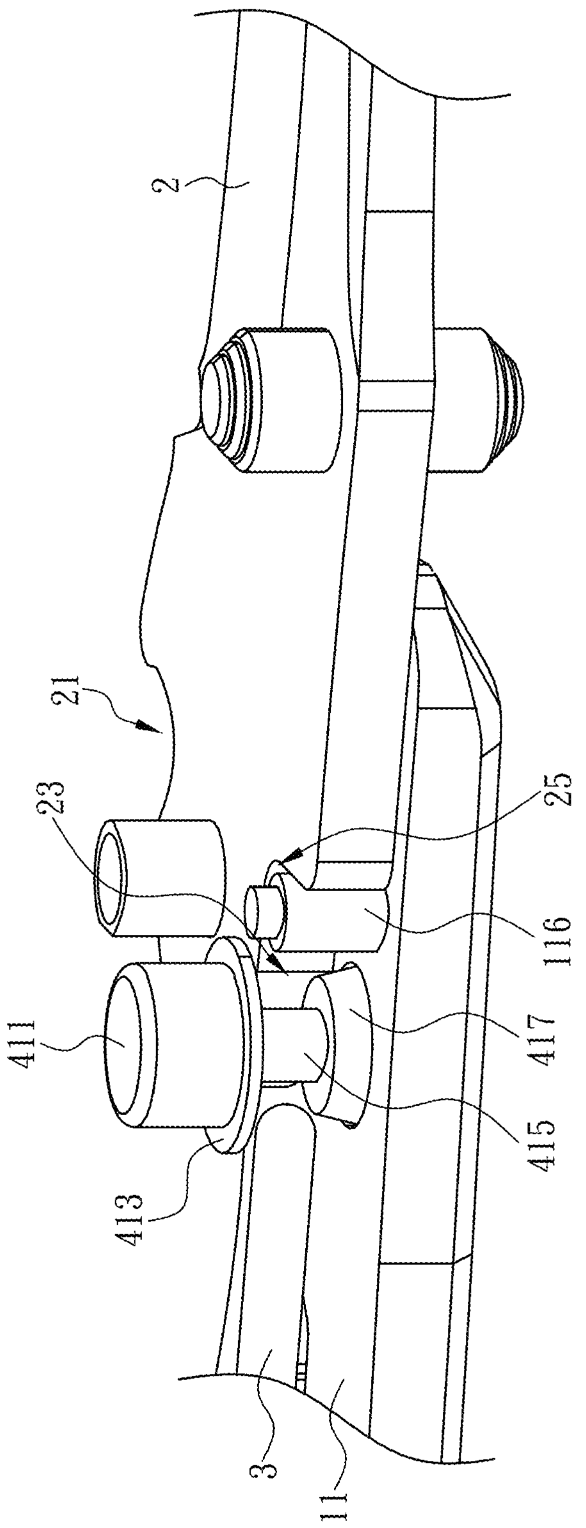
FIG. 9 is a perspective view of a portion of the folding knife that is fully unfolded according to certain embodiments of the present disclosure, omitting the second handle portion thereof.

The blade 2 can be put to use when it has been rotated fully out of the handle 1, and in order to maintain the stability of the blade 2 during use, referring to FIG. 4 and FIG. 9, in certain embodiments the blade 2 is further formed with a positioning groove 23 concavely formed at a peripheral portion of the rear end of the blade 2. When the blade 2 has been rotated fully out of the handle 1 and the pressing unit 411 is not pressed, the engaging unit 417 is pushed by the elastic element 43 and therefore pressed against the groove wall of the positioning groove 23. As a result, the blade 2 is blocked by the engaging unit 417 from inward rotation and thus securely kept in the current state. Moreover, to prevent the blade 2 from over-rotation, which if happening will prevent the blade 2 from staying in the predetermined unfolded state with respect to the handle 1 as shown in FIG. 2, in certain embodiments the inner side of the first handle portion 11 is protrudingly provided with a stop post 116, and the blade 2 is concavely formed with a stop groove 25 at a position adjacent to the positioning groove 23. Once the blade 2 is rotated fully out of the handle 1, the stop post 116 is in the stop groove 25 and abuts the groove wall of the stop groove 25 (as shown in FIG. 9). In this way, the blade 2 will not be able to rotate along a direction towards the back of the blade 2, so that the blade 2 and the handle 1 can present an unfolding status as expected.

Figure 10:
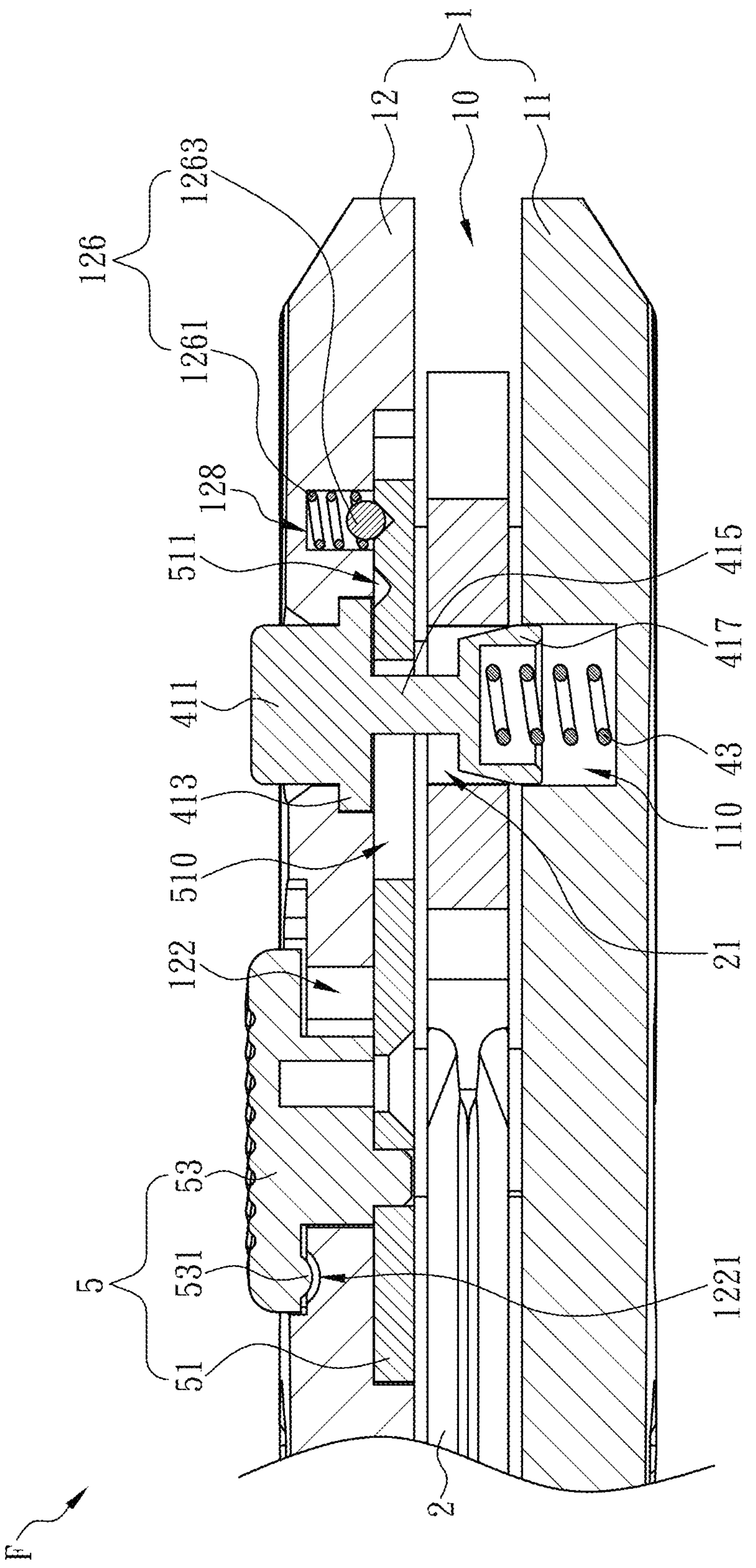
FIG. 10 is a cross-sectional view of a portion of the folding knife in which a second safety mechanism is in a locking state according to certain embodiments of the present disclosure.

Referring to FIG. 1, the second safety mechanism 5 includes a locking plate 51 and a driving portion 53. The locking plate 51 can be located in the receiving space 10, and one side of the locking plate 51 is formed with a moving groove 510. The moving groove 510 is so configured that the engaging post 41 can be extended into the moving groove 510, with the passage-allowing unit 415 of the engaging post 41 located in the moving groove 510. The driving portion 53 is located in the slide groove 122 and can be displaced forward and rearward in the slide groove 122. The inner side of the driving portion 53 is configured to pass through the slide groove 122 and be fixed to the locking plate 51 so that the driving portion 53 can drive the locking plate 51 to move in the receiving space 10. Referring to FIG. 10, when the blade 2 is stored in the handle 1 and the pressing unit 411 is not pressed, the driving portion 53 can be pushed by a user and moved in the right-to-left direction in FIG. 10. During the process, the driving portion 53 will move the locking plate 51 from an unlocking position to a locking position such that a portion of the locking plate 51 is moved to a position corresponding to a portion of the position-limiting unit 413. As a result, the blade 2 is blocked by the engaging unit 417 and cannot be rotated outward. A portion of the front end of the locking plate 51 that is adjacent to the moving groove 510 will be moved to a position under the position-limiting unit 413 (with reference to the directions in FIG. 10) such that when the pressing unit 411 is pressed, the position-limiting unit 413 will be blocked by the locking plate 51 and cannot move. The engaging unit 417, therefore, will remain pressed against the groove wall of the passage-allowing groove 21, preventing the blade 2 from spinning out of the handle 1 should the pressing unit 411 be inadvertently touched by the user or an external object while the folding knife F is not in use, which greatly enhances the safety of storage of the folding knife F.

Figure 11:
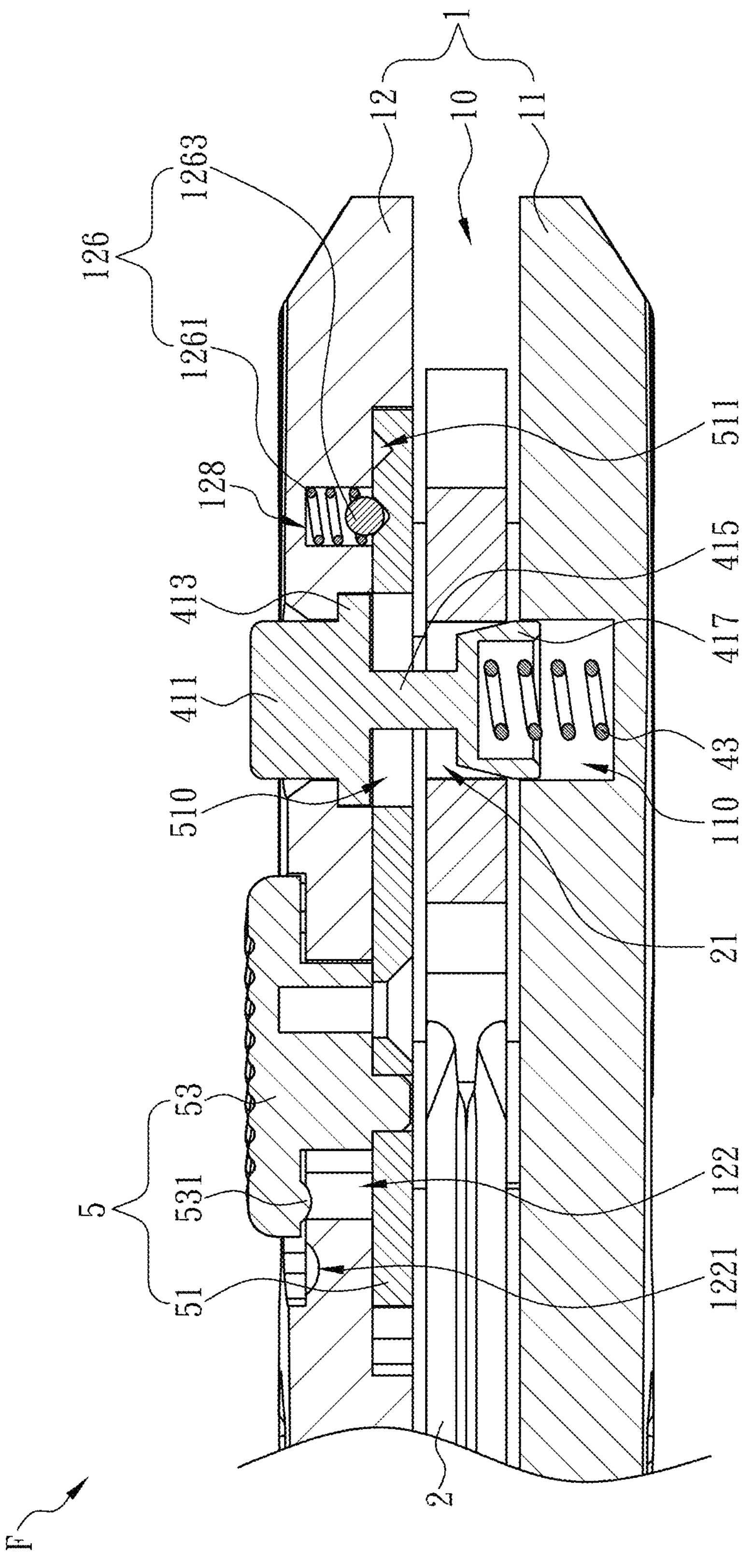
FIG. 11 is a cross-sectional view of a portion of the folding knife in which the second safety mechanism is in an unlocking state according to certain embodiments of the present disclosure.

Referring to FIG. 11 in conjunction with FIG. 1, when it is desired to use the folding knife F, the driving portion 53 can be pushed again such that the driving portion 53 is moved in the left-to-right direction in FIG. 11. During the process, the driving portion 53 will move the locking plate 51 from the locking position to the unlocking position such that no other portion of the locking plate 51 than the moving groove 510 corresponds to the position-limiting unit 413. The portion of the front end of the locking plate 51 that is adjacent to the moving groove 510 will be moved away from the position under the position-limiting unit 413 such that only the moving groove 510 is in a projected area of the position-limiting unit 413. When the pressing unit 411 is subsequently pressed, the position-limiting unit 413 will not be blocked by the locking plate 51, so the engaging unit 417 can be moved toward the groove bottom of the receiving groove 110 and thus disengaged from the groove wall of the passage-allowing groove 21 to allow the blade 2 to be pushed and rotated out of the handle 1 by the elastic bar 3. Once the blade 2 is rotated fully out of the handle 1 (as shown in FIG. 2), the user only has to operate the second safety mechanism 5 by moving the locking plate 51 from the unlocking position to the locking position, and the engaging post 41 will be blocked by the locking plate 51 and therefore cannot be pressed down. The blade 2, in turn, will be blocked by the engaging unit 417 and therefore cannot be rotated back into the handle 1, so as to promote the safety in use of the folding knife F.

To make it easier for a user to know from the feel of the operating hand whether the driving portion 53 has been pushed to the intended position, and to help increase the stability of the locking plate 51 at the locking position as well as the unlocking position, in certain embodiments the locking plate 51 is formed with two coupling recesses 511 (which can be arranged in the forward-rearward direction), and the second handle portion 12 is provided with a coupling portion 126 whose configuration matches that of any coupling recess 511 and which therefore can fit into any coupling recess 511. Referring to FIG. 10, when the driving portion 53 and the locking plate 51 are at the locking position, the coupling portion 126 is located in one of the coupling recesses 511 (e.g., the right coupling recess 511 in FIG. 10), and when the driving portion 53 and the locking plate 51 are at the unlocking position, the coupling portion 126 is located in the other coupling recess 511 (e.g., the left coupling recess 511 in FIG. 11). Thus, from the tactile feedback produced by the coupling portion 126 fitted into one or the other of the coupling recesses 511, the user can rapidly know whether the driving portion 53 has been pushed to the unlocking position or the locking position.

Certain configurations of the coupling portion 126 are described as follows. However, the present disclosure is not limited thereto. Referring to FIGS. 10 and 11, the inner side of the second handle portion 12 is formed with a hole 128, and the coupling portion 126 can be located in the hole 128. The coupling portion 126 includes a spring 1261 and a ball 1263. The spring 1261 is in the hole 128 and has one end pressed against the hole bottom of the hole 128. The ball 1263 is located at, and configured to be pushed by, the other end of the spring 1261. At least a portion of the ball 1263 is smaller than the diameter of the hole opening of the hole 128 so as to be exposed from the hole 128. When the coupling portion 126 corresponds in position to a coupling recess 511, this portion of the ball 1263 will be pushed out of the hole 128 and into the corresponding coupling recess 511 by the spring 1261, and when the coupling portion 126 corresponds in position to neither of the coupling recesses 511, the ball 1263 will be in the hole 128, compressing the spring 1261.

Besides the relevant design of the coupling portion 126, the folding knife F can be structured in another way in order for a user's operating hand to feel whether the driving portion 53 has been pushed to the intended position. Referring to FIG. 10 and FIG. 11 in conjunction with FIG. 1, the groove bottom of the slide groove 122 in certain embodiments can be formed with a recess 1221 while the inner side of the driving portion 53 has a protruding block 531. When the driving portion 53 is at the locking position (as shown in FIG. 10), the protruding block 531 is in the recess 1221, and when the driving portion 53 is moved toward the unlocking position, the protruding block 531 is moved away from the recess 1221. Thus, a user can rapidly know from the feel of the operating hand whether the driving portion 53 has been pushed to the unlocking position or the locking position, so as to improve the convenience in operation.

Besides, it can be expected that a user trying to operate the driving portion 53 and the engaging post 41 will use the first digit of the thumb to push the driving portion 53 and press the engaging post 41, so the driving portion 53 and the engaging post 41 should not be too far apart. Such an arrangement, however, may cause a user to touch the driving portion 53 or the engaging post 41 inadvertently during operation such that the smoothness of operation is impaired. In view of this, in certain embodiments, the second safety mechanism 5 is replaced with the adjusted second safety mechanism 7, and the location of the second safety mechanism 7 is different from the second safety mechanism 5, as shown in FIG. 12 to FIG. 14, in which certain identical or similar components are denoted with the same reference characters and are not described repeated infra for brevity.

Figure 12:
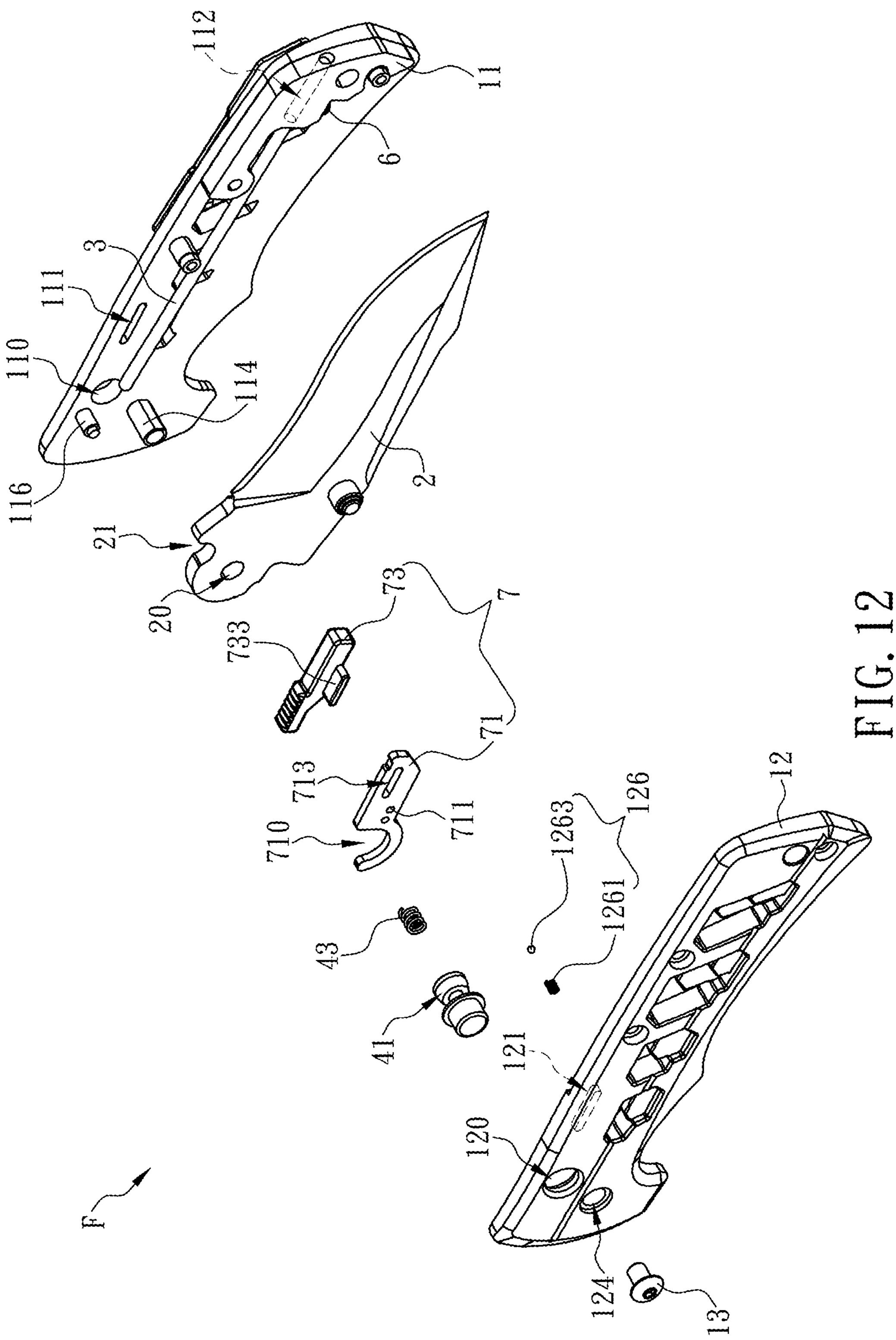
FIG. 12 is an exploded view of a folding knife from one perspective according to certain embodiments of the present disclosure.
Figure 13:
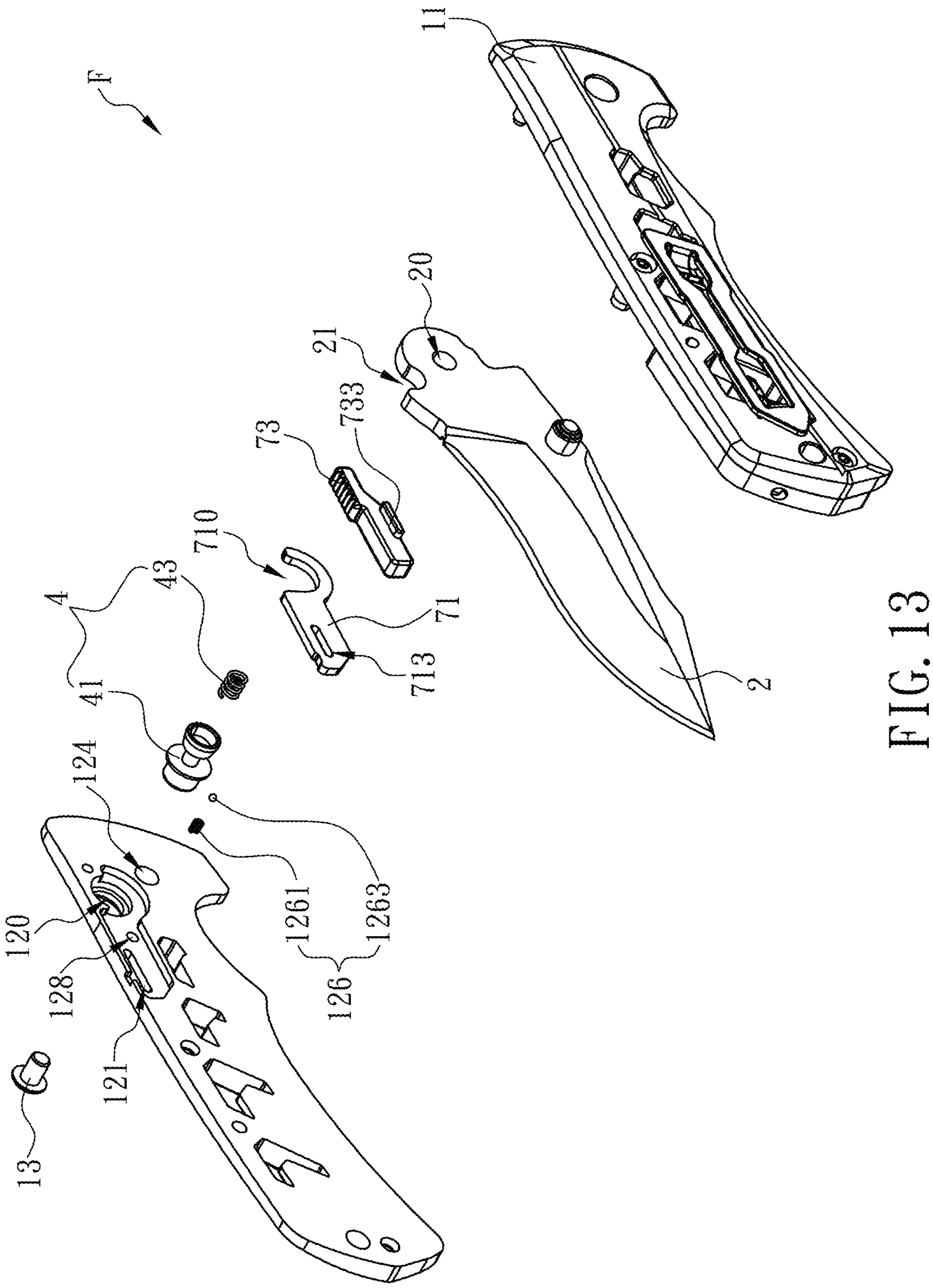
FIG. 13 is an exploded view of the folding knife from another perspective according to certain embodiments of the present disclosure.
Figure 14:
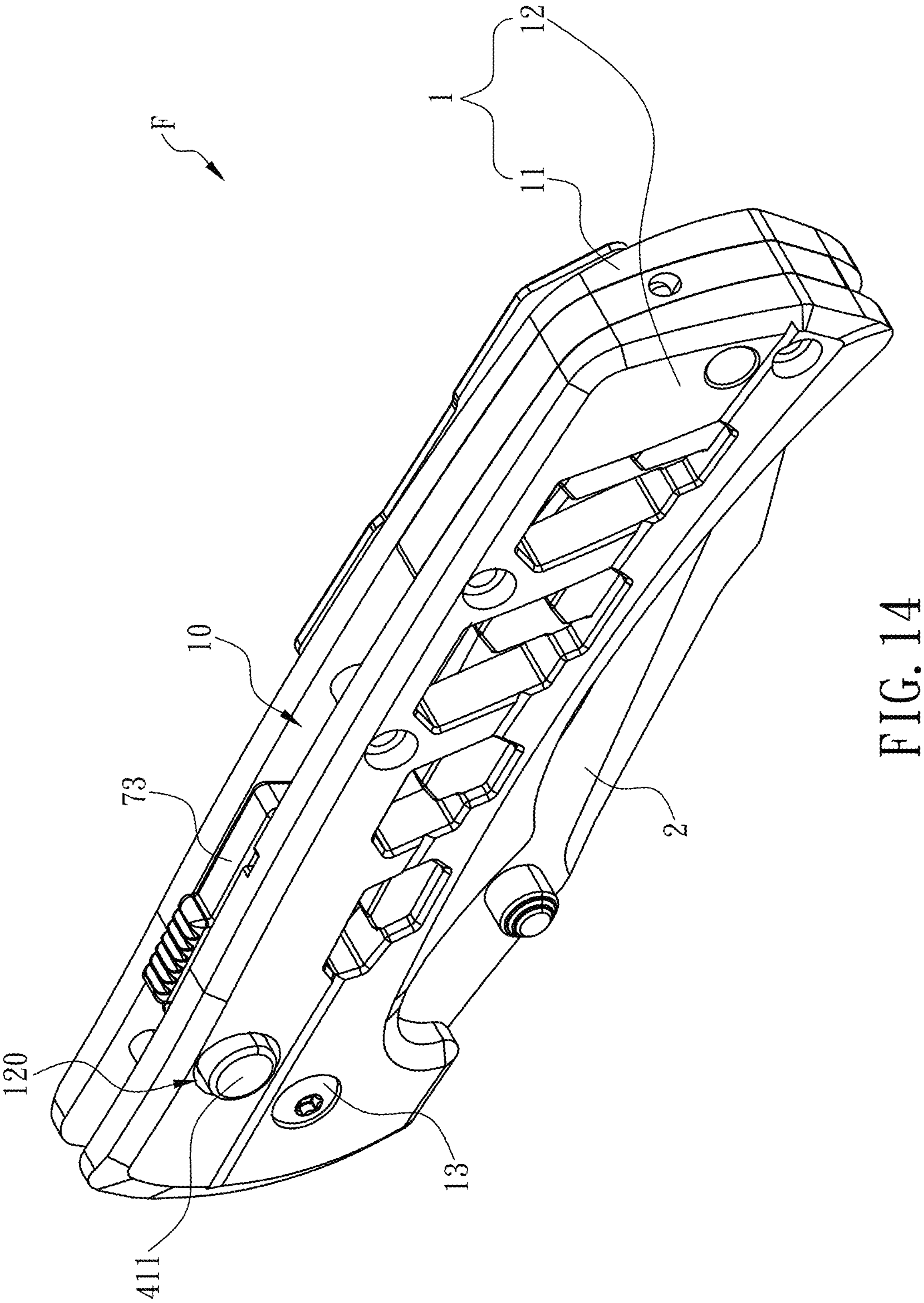
FIG. 14 is a schematic diagram of the folding knife been folded according to certain embodiments of the present disclosure, in which its blade has been stored fully in its handle.

Referring to FIG. 12 to FIG. 14, the adjusted second safety mechanism 7 includes a locking plate 71 and a driving portion 73. The locking plate 71 is located in the receiving space 10 of the handle 1. One side of the locking plate 71 is formed with a moving groove 710, and the moving groove 710 is so configured that the engaging post 41 of the first safety mechanism 4 can be extended into the moving groove 710. The driving portion 73 can be located in the receiving space 10 and can be pushed, and thereby displaced, forward and rearward. The driving portion 73 can be fixed to the locking plate 71 and can therefore drive the locking plate 71 to move. With reference to the directions in FIG. 12, the top side of the driving portion 73 is exposed from the top side of the handle 1 to make it easier for a user to push the driving portion 73, and each of two opposite sides of the driving portion 73 is provided with an assembly block 733. One of the assembly blocks 733 can pass through an assembly hole 713 formed on the locking plate 71 and be extended into a fixing groove 121 of the second handle portion 12. The other assembly block 733 can be extended into a fixing groove 111 of the first handle portion 11. Each of the lengths of the fixing grooves 111 and 121 is greater than the length of each assembly block 733 so that the driving portion 73 can drive the locking plate 71 into forward and rearward displacement. In certain embodiments, however, the fixing structures used among the driving portion 73, the locking plate 71, and the fixing grooves 111 and 121 may vary, as long as the driving portion 73 can drive the locking plate 71 when pushed.

Figure 15:
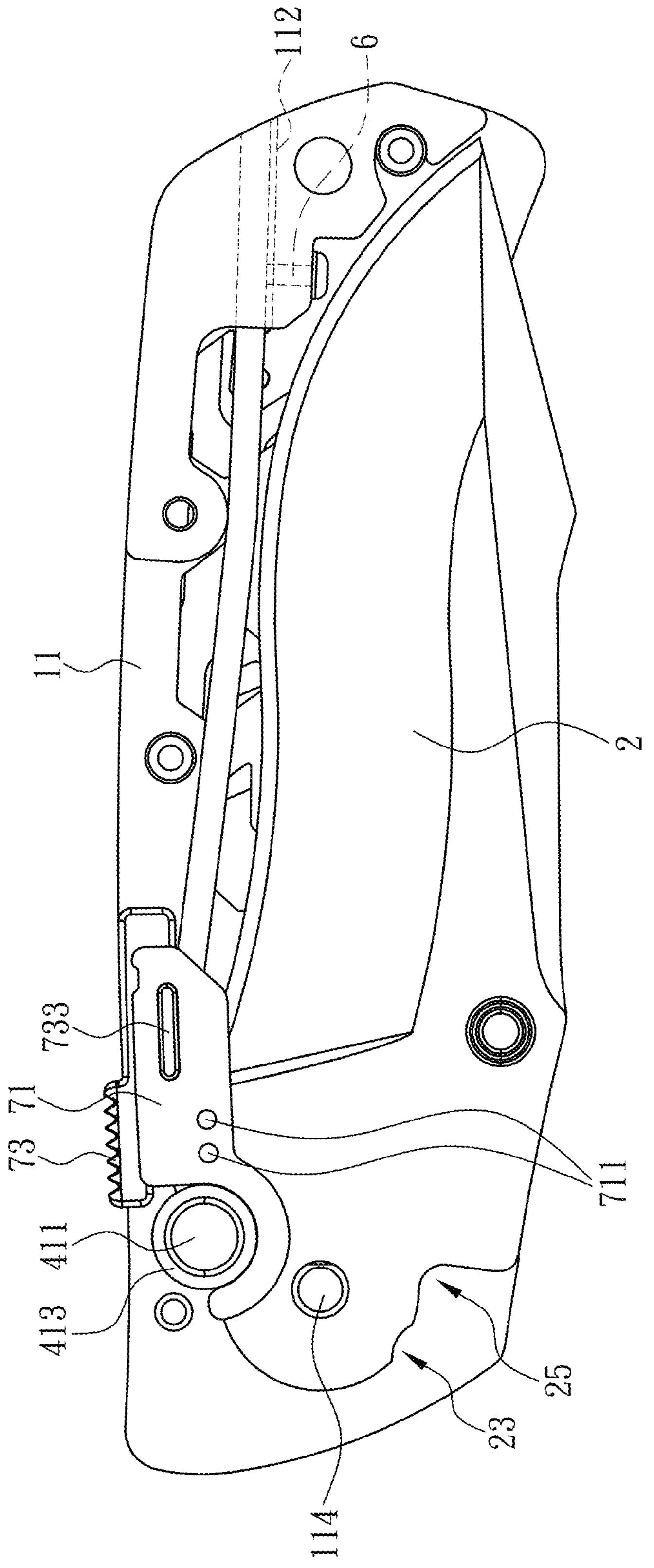
FIG. 15 is a cross-sectional view of a portion of the folding knife in which a second safety mechanism is in a locking state according to certain embodiments of the present disclosure.
Figure 16:
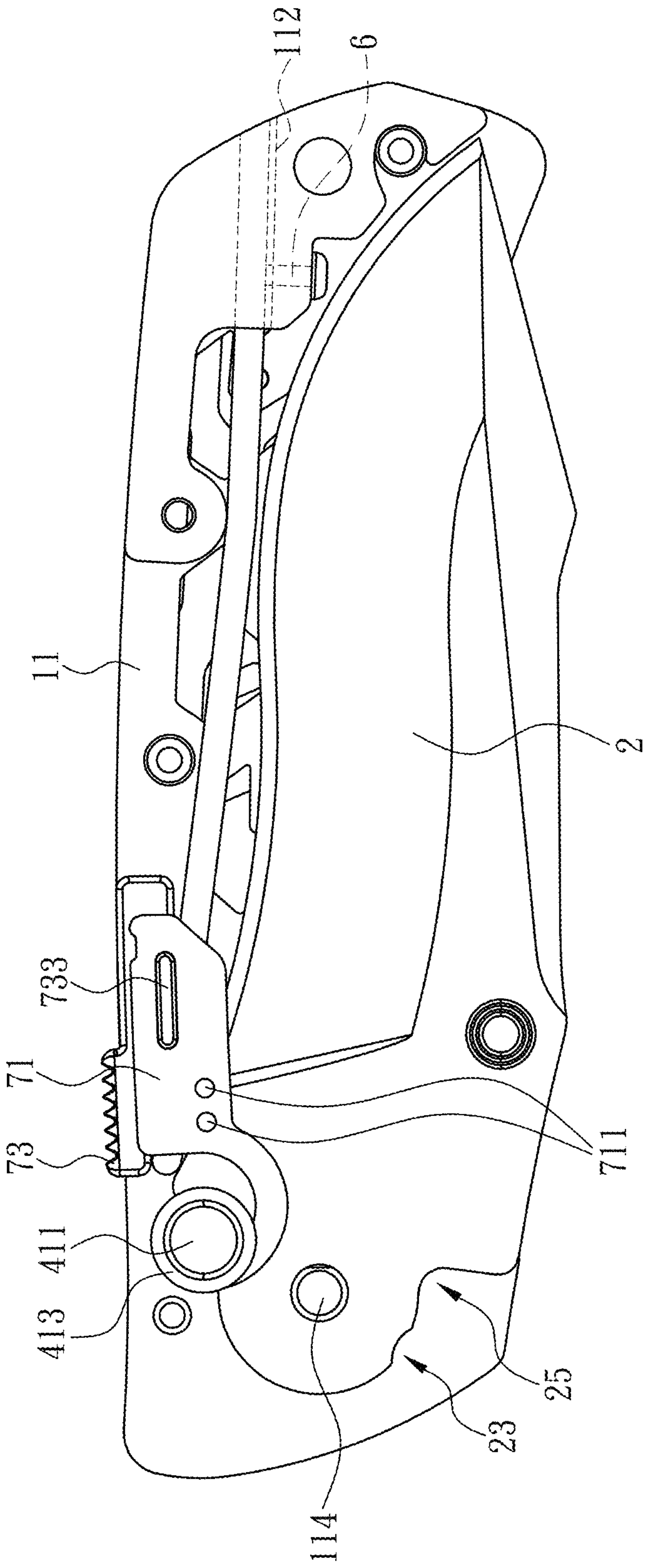
FIG. 16 is a cross-sectional view of a portion of the folding knife in which a second safety mechanism is in an unlocking state according to certain embodiments of the present disclosure.

Referring to FIG. 12 to FIG. 16, when the pressing unit 411 is not pressed, the driving portion 73 can be pushed in order for the driving portion 73 to move the locking plate 71 from an unlocking position (as shown in FIG. 15) to a locking position (as shown in FIG. 16), and for a portion of the locking plate 71 to correspond in position to a portion of the position-limiting unit 413 such that the engaging post 41 cannot move when pressed. The driving portion 73 can be subsequently pushed in order for the driving portion 73 to move the locking plate 71 from the locking position back to the unlocking position, where no other portion of the locking plate 71 than the moving groove 710 corresponds to the position-limiting unit 413, and where the engaging post 41 is therefore allowed to move when pressed. As the driving portion 73 and the pressing unit 411 are not located on the same plane, a user's pushing the driving portion 73 will not be interfered with by the pressing unit 411, and vice versa, which greatly enhances the ease and smoothness of operation.

Furthermore, to provide a user with an even more noticeable tactile feedback during operation to thereby enable the user to rapidly know whether the driving portion 73 has been pushed to the unlocking position or the locking position, referring to FIG. 12 and FIG. 14, the driving portion 73 can be provided with two coupling recesses 711. The coupling portion 126 of the second handle portion 12 can fit into a corresponding coupling recess 711 so as to produce a tactile feedback and help enhance the stability of the locking plate 71 at each of the locking position and the unlocking position.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A folding knife, comprising:

a handle, comprising:

a first handle portion formed with a receiving groove; and a second handle portion formed with a slide groove and a through hole corresponding in position to the receiving groove, wherein the handle has a receiving space between the first handle portion and the second handle portion, and at least a portion of a groove bottom of the slide groove is in communication with the receiving space;

a blade having a rear end pivotally connected to a front end of the handle, and configured to be rotated out of the handle and rotated into the receiving space of the handle around a position of the blade that is pivotally connected to the handle;

an elastic bar located in the receiving space of the handle, having a rear end configured to be extended into an assembly groove of the first handle portion and a front end located adjacent to the position of the blade that is pivotally connected to the handle, and configured to press against the blade and apply a rotating force to the blade that pushes the blade along a direction out of the handle when the blade is stored in the handle;

a first safety mechanism, comprising:

an engaging post, comprising:

a pressing portion configured to be extended into the through hole from an inner side of the second handle portion and be exposed from an outer side of the second handle portion;

a position-limiting portion, wherein a greatest length of the position-limiting portion in a transverse direction is greater than a hole diameter of the through hole, so as to prevent the engaging post from separating from the through hole;

an engaging portion configured to, when the pressing portion is pressed, be disengaged from the blade and prevented from being pressed against an outer edge of the blade, so that the blade is pushed by the elastic bar and rotated out of the handle and a portion of the outer edge of the blade passes through an area corresponding to the receiving groove while the blade is being rotated outward; and a passage-allowing portion, wherein a greatest length of the passage-allowing portion in the transverse direction is less than a greatest length of the engaging portion in the transverse direction; and an elastic element located in the receiving groove and configured to:

push the engaging portion in a direction away from the receiving groove; and when the blade is stored in the handle and the pressing portion is not pressed, push the engaging portion and press the engaging portion against the outer edge of the blade, so that the blade is blocked by the engaging portion and prevented from being rotated outward; and a second safety mechanism, comprising:

a locking plate located in the receiving space and formed at a side thereof with a moving groove for the engaging post to be extended therein; and a driving portion located in the slide groove, fixed to the locking plate, and configured to be displaced forward and rearward; drive the locking plate to move; move the locking plate from an unlocking position to a locking position when the pressing portion is not pressed, such that a portion of the locking plate is moved to a position corresponding to and directly under a bottom surface of a portion of the position-limiting portion and above a top surface of a portion of the engaging portion, and the engaging post is blocked by the portion of the locking plate that is directly under the portion of the position-limiting portion, and prevented from being pressed to move; and move the locking plate from the locking position to the unlocking position such that no other portion of the locking plate than the moving groove corresponds to the position-limiting portion and the engaging post is allowed to be pressed to move, wherein the groove bottom of the slide groove is formed with a recess, an inner side of the driving portion has a protruding block, when the driving portion is at the locking position, the protruding block is in the recess, and when the driving portion is moved toward the unlocking position, the protruding block is moved away from the recess.

2. The folding knife according to claim 1, wherein one side of the blade is concavely formed with a passage-allowing groove, the passage-allowing groove corresponds in position to the receiving groove when the blade is stored in the receiving space of the handle, the engaging portion is extended into the passage-allowing groove and pressed against a groove wall of the passage-allowing groove when the pressing portion is not pressed, the engaging portion is disengaged from the passage-allowing groove and leaves the passage-allowing portion in the passage-allowing groove when the pressing portion is pressed, and the passage-allowing portion is configured to allow passage of the blade without being touched by the blade when the blade is rotated out of the handle around the position of the blade that is pivotally connected to the handle.

3. The folding knife according to claim 2, wherein a width of a first end of the engaging portion that is closer to the passage-allowing portion than a second end of the engaging portion increases along a direction toward the second end of the engaging portion, and a greatest width of the engaging portion is greater than a distance between any two opposite sidewall portions of the passage-allowing groove.

4. The folding knife according to claim 1, wherein a positioning groove is concavely formed at a peripheral portion of the rear end of the blade, and the elastic element is configured to, when the blade is rotated fully out of the handle and the pressing portion is not pressed, push the engaging portion and press the engaging portion against a groove wall of the positioning groove, so that the blade is blocked by the engaging portion from inward rotation.

5. The folding knife according to claim 4, wherein an inner side of the first handle portion is protrudingly provided with a stop post, the blade is concavely formed with a stop groove at a position adjacent to the positioning groove, and the stop post is in the stop groove and abuts a groove wall of the stop groove when the blade is rotated fully out of the handle.

6. The folding knife according to claim 1, further comprising a locking member configured to be extended into the assembly groove and press against the elastic bar from a lateral side of the elastic bar.

7. The folding knife according to claim 6, wherein the locking member is a screw.

8. The folding knife according to claim 1, wherein the locking plate is formed with two coupling recesses, the second handle portion is provided with a coupling portion, and the coupling portion is located in one of the coupling recesses when the driving portion and the locking plate are at the locking position, and located in the other one of the coupling recesses when the driving portion and the locking plate are at the unlocking position.

9. The folding knife according to claim 8, wherein the inner side of the second handle portion is formed with a hole, and the coupling portion comprises:

a ball, wherein at least a portion of the ball is configured to be exposed from the hole and be pushed in one of the coupling recesses; and a spring located in the hole and having a first end pressed against a hole bottom of the hole and a second end configured to push the ball.

10. A folding knife, comprising:

a handle, comprising:

a first handle portion formed with a receiving groove at an inner side thereof; and a second handle portion formed with a through hole corresponding in position to the receiving groove, wherein the handle has a receiving space between the first handle portion and the second handle portion;

a blade having a rear end pivotally connected to a front end of the handle, and configured to be rotated out of the handle and rotated into the receiving space of the handle around a position of the blade that is pivotally connected to the handle;

an elastic bar located in the receiving space of the handle, having a rear end configured to be extended into an assembly groove of the handle and a front end located adjacent to the position of the blade that is pivotally connected to the handle, and configured to press against the blade and apply a rotating force to the blade that pushes the blade along a direction out of the handle when the blade is stored in the handle;

a first safety mechanism, comprising:

an engaging post, comprising:

a pressing portion configured to be extended into the through hole from an inner side of the second handle portion and be exposed from an outer side of the second handle portion;

a position-limiting portion, wherein a greatest length of the position-limiting portion in a transverse direction is greater than a hole diameter of the through hole, so as to prevent the engaging post from separating from the through hole;

an engaging portion configured to be extended in the receiving groove and, when the pressing portion is pressed, be disengaged from the blade and prevented from being pressed against an outer edge of the blade, so that the blade is pushed by the elastic bar and rotated out of the handle and a portion of the outer edge of the blade passes through an area corresponding to the receiving groove while the blade is being rotated outward; and a passage-allowing portion, wherein a greatest length of the passage-allowing portion in the transverse direction is less than a greatest length of the engaging portion in the transverse direction; and an elastic element located in the receiving groove and configured to:

push the engaging portion in a direction away from the receiving groove; and when the blade is stored in the handle and the pressing portion is not pressed, push the engaging portion and press the engaging portion against the outer edge of the blade, so that the blade is blocked by the engaging portion and prevented from being rotated outward; and a second safety mechanism, comprising:

a locking plate located in the receiving space and formed at a side thereof with a moving groove for the engaging post to be extended therein; and a driving portion located in the receiving space, fixed to the locking plate, and configured to be displaced forward and rearward; drive the locking plate to move; move the locking plate from an unlocking position to a locking position when the pressing portion is not pressed, such that a portion of the locking plate is moved to a position corresponding to and directly under a bottom surface of a portion of the position-limiting portion and above a top surface of a portion of the engaging portion, and the engaging post is blocked by the portion of the locking plate that is directly under the portion of the position-limiting portion, and prevented from being pressed to move; and move the locking plate from the locking position to the unlocking position such that no other portion of the locking plate than the moving groove corresponds to the position-limiting portion and the engaging post is allowed to be pressed to move, wherein a groove bottom of a slide groove of the second handle portion is formed with a recess, an inner side of the driving portion has a protruding block, when the driving portion is at the locking position, the protruding block is in the recess, and when the driving portion is moved toward the unlocking position, the protruding block is moved away from the recess.

11. The folding knife according to claim 10, wherein one side of the blade is concavely formed with a passage-allowing groove, the passage-allowing groove corresponds in position to the receiving groove when the blade is stored in the receiving space of the handle, the engaging portion is extended into the passage-allowing groove and is pressed against a groove wall of the passage-allowing groove when the pressing portion is not pressed, the engaging portion is disengaged from the passage-allowing groove and leaves the passage-allowing portion in the passage-allowing groove when the pressing portion is pressed, and the passage-allowing portion is configured to allow passage of the blade without being touched by the blade when the blade is rotated out of the handle around the position of the blade that is pivotally connected to the handle.

12. The folding knife according to claim 11, wherein a width of a first end of the engaging portion that is closer to the passage-allowing portion than a second end of the engaging portion increases along a direction toward the second end of the engaging portion, and a greatest width of the engaging portion is greater than a distance between any two opposite sidewall portions of the passage-allowing groove.

13. The folding knife according to claim 10, wherein a positioning groove is concavely formed at a peripheral portion of the rear end of the blade, and the elastic element is configured to, when the blade is rotated fully out of the handle and the pressing portion is not pressed, push the engaging portion and press the engaging portion against a groove wall of the positioning groove, so that the blade is blocked by the engaging portion from inward rotation.

14. The folding knife according to claim 13, wherein the inner side of the first handle portion is protrudingly provided with a stop post, the blade is concavely formed with a stop groove at a position adjacent to the positioning groove, and the stop post is in the stop groove and abuts a groove wall of the stop groove when the blade is rotated fully out of the handle.

15. The folding knife according to claim 10, further comprising a locking member configured to be extended into the assembly groove and press against the elastic bar from a lateral side of the elastic bar.

16. The folding knife according to claim 15, wherein the locking member is a screw.

17. The folding knife according to claim 10, wherein the locking plate is formed with two coupling recesses, the second handle portion is provided with a coupling portion, and the coupling portion is located in one of the coupling recesses when the driving portion and the locking plate are at the locking position, and located in the other one of the coupling recesses when the driving portion and the locking plate are at the unlocking position.

18. The folding knife according to claim 17, wherein the inner side of the second handle portion is formed with a hole, and the coupling portion comprises:

a ball, wherein at least a portion of the ball is configured to be exposed from the hole and be pushed in one of the coupling recesses; and a spring located in the hole and having a first end pressed against a hole bottom of the hole and a second end configured to push the ball.

* * * * *